Oct. 6, 1964 M. L. WOODWARD 3,152,216
AUTOMATIC NON-GLARE MIRROR
Filed April 6, 1959 3 Sheets-Sheet 3

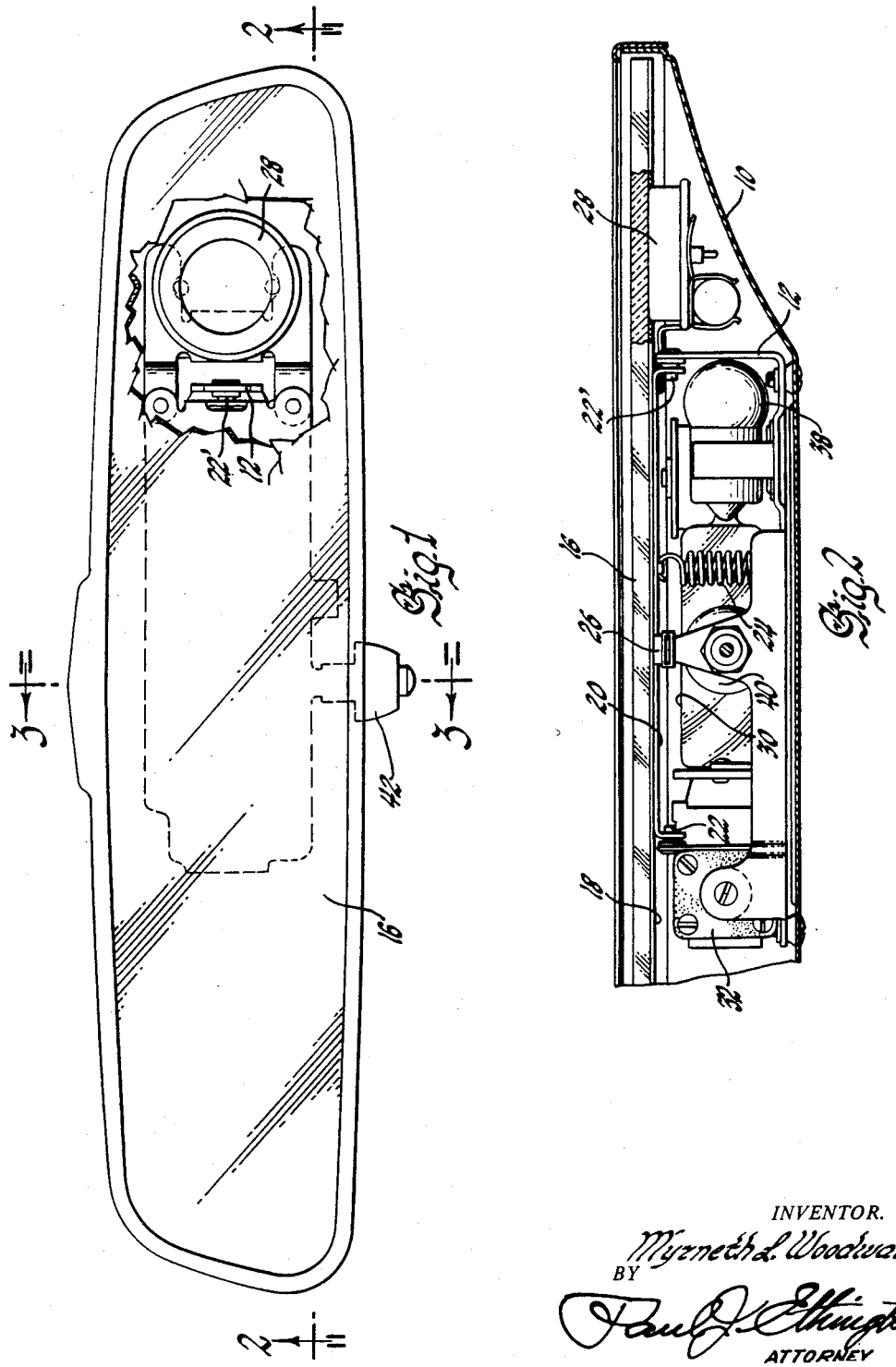

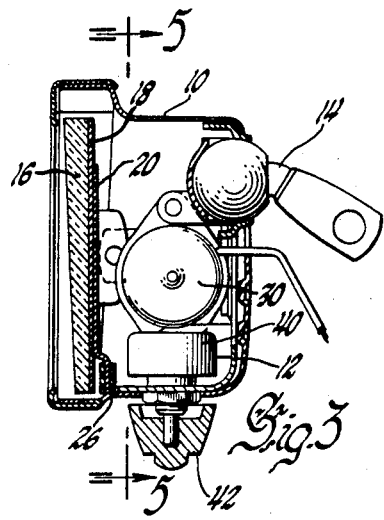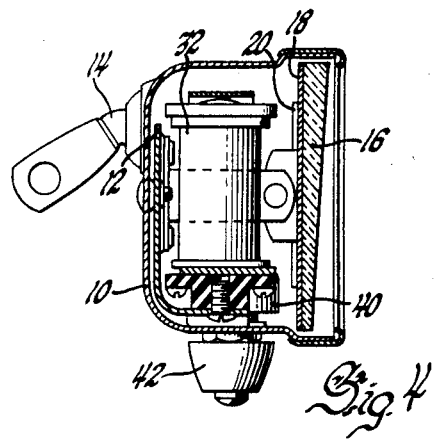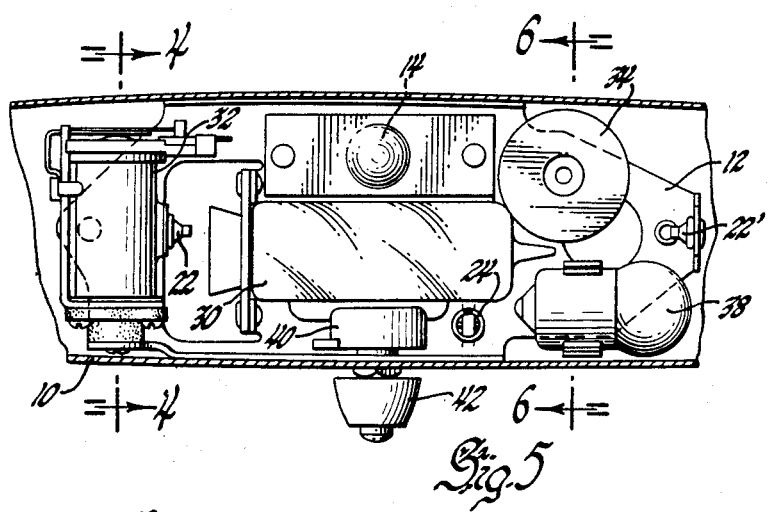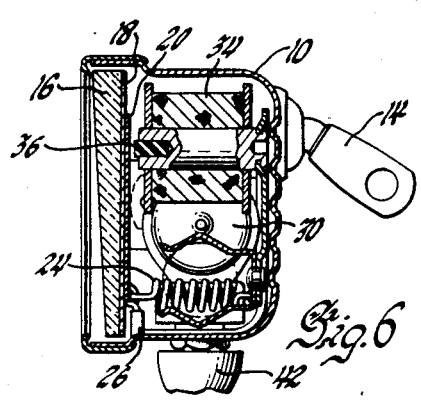

INVENTOR.
Myrneth L. Woodward
BY
Paul J. Ethington
ATTORNEY

3,152,216
AUTOMATIC NON-GLARE MIRROR
Myrneth L. Woodward, Lapel, Ind., assignor to General Motors Corporation, Detroit, Mich., a corporation of Delaware
Filed Apr. 6, 1959, Ser. No. 804,472
3 Claims. (Cl. 88—77)

This invention relates to non-glare rear view mirrors for automobiles and more particularly to an automatically controlled non-glare mirror.

It has been proposed to utilize a photocell system for actuating a rear-view non-glare mirror when the reflected light from a vehicle behind reaches an intensity which would produce glare in the eyes of the driver. A principle object of this invention is to provide an automatic non-glare mirror with an improved light responsive control circuit adapted for installation within the mirror housing. In general, this is accomplished by a photocell and amplifier which control a sensitive relay for controlling the energization of an electromagnet which in turn actuates the non-glare mirror. A temperature responsive resistance is connected with the electromagnet to permit an initial surge of current to pull-in the armature and a steady state current value to hold-in the armature, thus permitting an electromagnet of relatively few turns and small size. Additionally, the sensitivity of the system is changed upon actuation of the sensitive relay to enhance the stability of the system and prevent hunting or cycling in response to slight changes of light intensity about the operating point.

A more complete understanding of the invention may be had from the detailed description which follows taken from the accompanying drawings in which:

FIGURE 1 is a front elevation view of the non-glare mirror with parts broken away to reveal details of construction;

FIGURE 2 is a section taken on lines 2—2 of FIGURE 1;

FIGURE 3 is a section taken on lines 3—3 of FIGURE 1;

FIGURE 4 is a sectional view taken on lines 4—4 of FIGURE 5;

FIGURE 5 is a sectional view taken on lines 5—5 of FIGURE 3;

FIGURE 6 is a sectional view taken on lines 6—6 of FIGURE 5;

Figure 7:
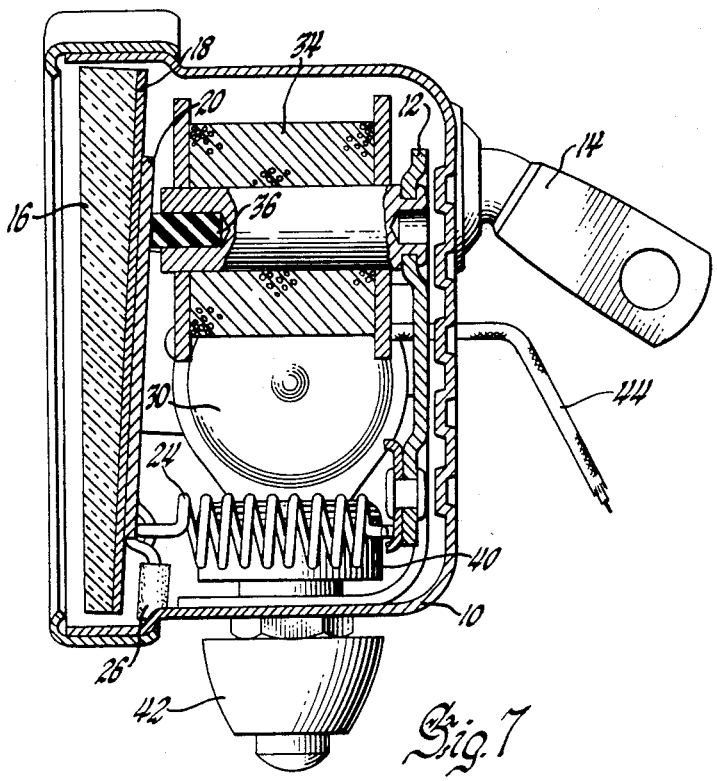
FIGURE 7 is a sectional view showing details of construction.

Referring now to the drawings, there is shown an illustrative embodiment of the invention in a non-glare rear view mirror of the prismoidal type providing a rear surface image reflection in its normal or "day" position and a front surface image reflection of reduced intensity in its non-glare or "night" position. The non-glare mirror comprises a housing 10, of channel shape in cross-section, within which is a mounting bracket 12. The bracket and housing coact to form a socket for a ball stud 14 to adapt the mirror for conventional installation and angular adjustment in an automobile. A prismoidal mirror 16 having a reflective coating 18 on its rear surface is provided with a support plate 20 affixed thereto by cement or other adhesive. The mirror is pivotally mounted on the bracket 12 by the oppositely disposed pivot pins 22 and 22' and is held in its normal or day position by a spring 24 interposed between the bracket 20, at a point below the pivot axis, and the mounting plate 12. A stop arm 26 extends from the plate 20 into alignment with the edge of the mounting bracket 12 to limit the angular movement of the mirror under the influence of the spring 24. The arm 26 is provided with a sleeve of rubber to avoid noisy operation. A photocell 28 is affixed to the rear surface of the mirror 16 over a window in the reflective coating 18 and provides a signal for an amplifier including an electron tube 30. The amplifier controls the energization of a control relay 32 for an electromagnet 34. The electromagnet is mounted by its core upon the mounting bracket 12 so that the core is disposed adjacent the plate 20 which serves as an armature of the electromagnet and actuates the mirror to its non-glare position. To further quiet the operation of the mirror, the outer end of the core of the electromagnet is provided with a rubber plug 36. A light bulb 38 is used as a temperature responsive resistance element in series with the energizing coil of the electromagnet 34 to provide a surge of pull-in current. Also included in the mirror housing is a potentiometer 40 having an operating shaft extending through the housing to a control knob 42 to permit adjustment of the system sensitivity by the driver. The system receives electrical energy through a single supply conductor 44 and a return or ground path is provided through the housing in a conventional manner.

Figure 8:
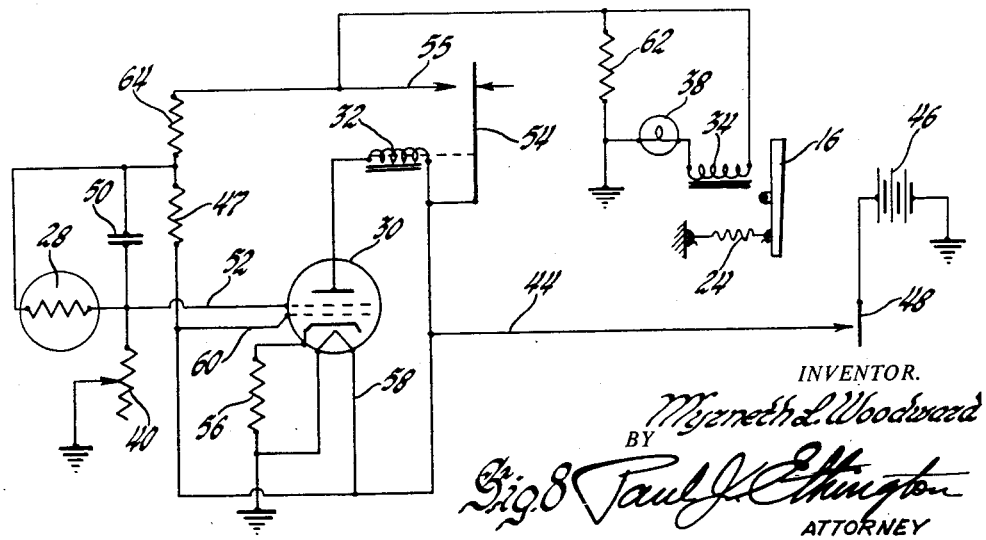
FIGURE 8 is a schematic diagram of the control circuit for the rear view mirror.

Referring now to FIGURE 8, the control circuit is shown in schematic fashion and components thereof referred to in the foregoing description are referred to by the same reference characters. The control circuit is energized from a voltage source, such as the car battery 46, having one terminal connected to ground, such as the vehicle body, and the other terminal connected to a manually actuable switch 48. A signal voltage generating circuit includes the photocell 28 which is suitably a photoconductive cell and exhibits decreased electrical resistance with increased incident light intensity. The photocell is connected with the voltage source through a voltage divider including resistors 47 and 64 which are connected in series across the voltage source through conductor 44 and the energizing coil of electromagnet 34. The photocell is connected in series with the potentiometer 40 between the junction of the voltage divider resistors and ground. The signal voltage is developed across the potentiometer and a condenser 50 is connected in parallel with the photocell to delay the change of signal voltage. The signal voltage is applied through conductor 52 to the control grid of the electron tube 30. The positive voltage from the battery is applied through switch 48 and conductor 44 to the energizing coil of the control relay 32 and to its movable contact 54 and thence to the plate of the electron tube 30. The cathode of the tube is connected to ground through a cathode bias resistor 56 and the heater filament is connected between the conductor 44 and ground through the conductor 58. The positive battery voltage is applied directly to the accelerating grid of the tube through the conductor 60.

The energizing coil of the electromagnet 34 is connected in series with the light bulb 38 between the fixed contact 55 of the control relay and ground. The light bulb is suitably a conventional tungsten filament lamp which exhibits an increase of resistance with increased temperature resulting from the heating effect of current flow. A resistor 62 is connected in parallel with the coil of electromagnet 34 and light bulb 38 to protect the contacts of the control relay upon collapse of the magnetic field of the electromagnet.

In operation, with the mirror assembly installed in an automobile and properly adjusted to provide the driver with a field of view to the rear of the automobile, the photocell 28 "looks" through the mirror and responds to the light incident upon the mirror. The dark resistance of the photocell 28 is very high so that when there are no cars approaching from the rear very little current flows through the photocell. Consequently, the voltage across the potentiometer 40 and at the control grid of the electron tube is substantially zero. With this control grid voltage, together with a biasing action of the cathode bias resistor 56, the conduction of the electron tube 30 is insufficient to pull-in the control relay 32 and the contacts 54 and 55 are open. With the control relay contacts open, the electromagnet 34 is deenergized and the mirror 16 is held in its normal position by the spring 24. The sensitivity of the system is determined by the voltage across the photocell and in this dark condition, the resistor 64 is connected to ground through the coil of electromagnet 34 and the light bulb 38 so that the voltage on the photocell is about one-half the battery voltage. When a car approaches from the rear, the light from its headlamps impinges upon the photocell 28 and reduces its resistance. With increased light intensity, current begins to flow through the photocell 28 and the voltage on the control grid of the electron tube becomes more positive. Thus, the conduction of the tube increases and at a predetermined value of light intensity, the control relay 32 is pulled-in causing the movable contact 54 to engage the fixed contact 5. Consequently, the battery voltage is applied to the winding of electromagnet 34 and since the cold resistance of the light bulb 38 is low, a surge of pull-in current is drawn by the electromagnet. This pull-in current surge is sufficient to actuate the rear view mirror 16 to its non-glare position. As the filament temperature of the light bulb increases, its resistance increases causing the current drawn by the electromagnet to diminish to a steady state value which is sufficient to hold-in the armature and maintain the rear view mirror in its non-glare position.

Simultaneously with actuation of the mirror the sensitivity of the system is increased to prevent hunting or cycling of the system in response to slight changes in light intensity. This increased sensitivity results from the connection of the resistor 64 through the relay contacts 54 and 55 to the positive terminal of the battery, thus raising the voltage across the photocell 28 and potentiometer 40 to the full battery voltage. When the light intensity decreases, the conduction of the electron tube 30 will decrease until the control relay 32 drops out causing the relay contacts 54 and 55 to open which deenergizes the electromagnet 34 and the mirror 16 is returned to its normal position by the spring 24. In order that the driver may adjust the sensitivity of the system to suit his preference, the potentiometer 40 may be adjusted by knob 42 to change the magnitude of the signal voltage on the control grid of the electron tube for a given value of light intensity to establish the operating point of the system. Response of the system to short interval light flashes is prevented by the condenser 50 which delays the change of the signal voltage.

Although the description of this invention has been given with respect to a particular embodiment it is not to be construed in a limiting sense. Many variations and modifications within the spirit and scope of the invention will now occur to those skilled in the art. For a definition of the invention reference is made to the appended claims.

I claim:

1. An automatic non-glare mirror comprising a support member, a prismoidal mirror pivotally connected with the support member, yieldable means urging the mirror toward a normal position, an electromagnet including an energizing coil mounted on the housing and an armature operatively connected with the mirror to actuate the mirror to a non-glare position, said armature being movable toward and away from said energizing coil whereby the current required to hold said armature in an actuated position is less than the current required to actuate said armature, a voltage source, a photocell adjacent the mirror and responsive to light incident upon the mirror, a control circuit connected with the voltage source and interposed between the photocell and the electromagnet, said control circuit being adapted to connect said voltage source across the energizing coil of the electromagnet in response to a predetermined value of light incident upon the photocell, and a resistance element having a positive temperature coefficient connected in series with the energizing coil of the electromagnet whereby the electromagnet is energized to actuate the mirror and draws a surge of pull-in current which diminishes to a hold-in current value as the resistance element is heated thereby.

2. An automatic non-glare mirror comprising a support member, a prismoidal mirror pivotally connected with the support member, yieldable means urging the mirror toward a normal position, an electromagnet including an energizing coil mounted on the support member and an armature operatively connected with the mirror to actuate the mirror to a non-glare position, said armature being movable toward and away from said energizing coil whereby the current required to hold said armature in an actuated position is less than the current required to actuate said armature, a voltage source, a photocell adjacent the mirror and responsive to light incident upon the mirror, a control relay including an energizing coil and switching contacts actuated thereby, an amplifier having its input circuit connected with the photocell and its output circuit connected with the energizing coil of the relay, a resistance element having a positive temperature coefficient connected in series with the energizing coil of the electromagnet between one of the switching contacts and one terminal of the voltage source, voltage divider resistors connected in series between said one of said switching contacts and said voltage source, said photocell connected between the junction of said voltage divider resistors and the other terminal of said voltage source, the other of said switching contacts being connected with the other terminal of the voltage source whereby closing said contacts causes the electromagnet to be energized to actuate the mirror and to draw a surge of pull-in current which diminishes to a hold-in current value as the resistance element is heated thereby and the sensitivity of the system is increased due to the increased voltage across the photocell.

3. An automatic non-glare mirror comprising a housing, a prismoidal mirror pivotally connected with the housing, a spring urging the mirror toward a normal position, an electromagnet including an energizing coil mounted on the housing and an armature secured to the mirror to actuate the mirror to a non-glare position, said armature being movable toward and away from said energizing coil whereby the current required to hold said armature in an actuated position is less than the current required to actuate said armature, a voltage source having its negative terminal connected to ground, a photoconductive cell mounted adjacent the mirror and responsive to incident light, a pair of voltage divider resistors connected between the positive terminal of the voltage source and ground through the energizing coil of the electromagnet, a potentiometer resistor, the photoconductive cell and the potentiometer resistor being connected serially between the junction of the voltage divider resistors and ground, a control relay including an energizing coil and switching contacts actuated thereby, an amplifier having its cathode connected to ground, its plate connected to the positive terminal of the voltage source through the energizing coil of the relay, and its control grid connected to the junction of the photoconductive cell and the potentiometer resistor, a resistance element having a positive temperature coefficient connected in series with the energizing coil of the electromagnet between one of the switching contacts and ground, the other of said switching contacts being connected with the positive terminal of the voltage source whereby the electromagnet is energized with a current surge due to the initially low resistance of said element and the mirror is displaced to its non-glare position when the contacts are closed and the sensitivity of the system is increased due to the increased voltage across the photoconductive cell.

References Cited in the file of this patent

UNITED STATES PATENTS

| | | |
|---|---|---|
| 1,437,074 | Procter | Nov. 28, 1922 |
| 1,887,706 | Bettman | Nov. 15, 1932 |
| 2,669,159 | Rogers | Feb. 16, 1954 |
| 2,697,803 | Eadie | Dec. 21, 1954 |
| 2,773,219 | Aron | Dec. 4, 1956 |
| 2,806,408 | Moeller | Sept. 17, 1957 |
| 2,912,593 | Deuth | Nov. 10, 1959 |

OTHER REFERENCES

Article: "Self-deflecting Automobile Rear-view Mirror," Electronics, July 1, 1957, page 196.